United States Patent [19]
Misawa

[11] Patent Number: 5,699,196
[45] Date of Patent: Dec. 16, 1997

[54] MICROSCOPE OBJECTIVE LENS AND MICROSCOPE

[75] Inventor: Junichi Misawa, Yokohama, Japan

[73] Assignee: Nikon Corporation, Tokyo, Japan

[21] Appl. No.: 684,813

[22] Filed: Jul. 22, 1996

[30] Foreign Application Priority Data

Jul. 21, 1995 [JP] Japan .................. 7-207602

[51] Int. Cl.$^6$ .................. G02B 21/02; G02B 9/60
[52] U.S. Cl. .................. 359/659; 359/767
[58] Field of Search .................. 359/656, 657, 359/658, 659, 767

[56] References Cited

U.S. PATENT DOCUMENTS

| | | | |
|---|---|---|---|
| 4,501,474 | 2/1985 | Kimura | 359/659 |
| 5,132,845 | 7/1992 | Suzuki | 359/656 |
| 5,270,860 | 12/1993 | Suzuki | 356/656 |
| 5,444,573 | 8/1995 | Saito | 359/659 |
| 5,502,596 | 3/1996 | Suzuki | 359/656 |
| 5,517,360 | 5/1996 | Suzuki | 359/656 |

Primary Examiner—Scott J. Sugarman
Attorney, Agent, or Firm—Foley & Lardner

[57] ABSTRACT

A microscope objective lens is provided as a semi-apochromatic microscope objective lens which has a magnification of about 40, has favorably corrected various kinds of aberration, and can also be used for observing fluorescence under downward radiation. The microscope objective lens comprises, successively from the object side, a positive meniscus lens component G1 having a concave surface directed onto the object side, a positive meniscus cemented lens component G2 having a concave surface directed onto the object side, a biconvex lens component G3, a cemented lens component G4 having, at least, a negative lens and a biconvex lens, and a negative meniscus cemented lens component G5 having a concave surface directed onto the image side, wherein the following conditions:

$$0.1 < r1/r3 < 0.3$$

$$-30 < f2/f1 < -10$$

$$5 < D/f < 8.5$$

are satisfied.

9 Claims, 10 Drawing Sheets

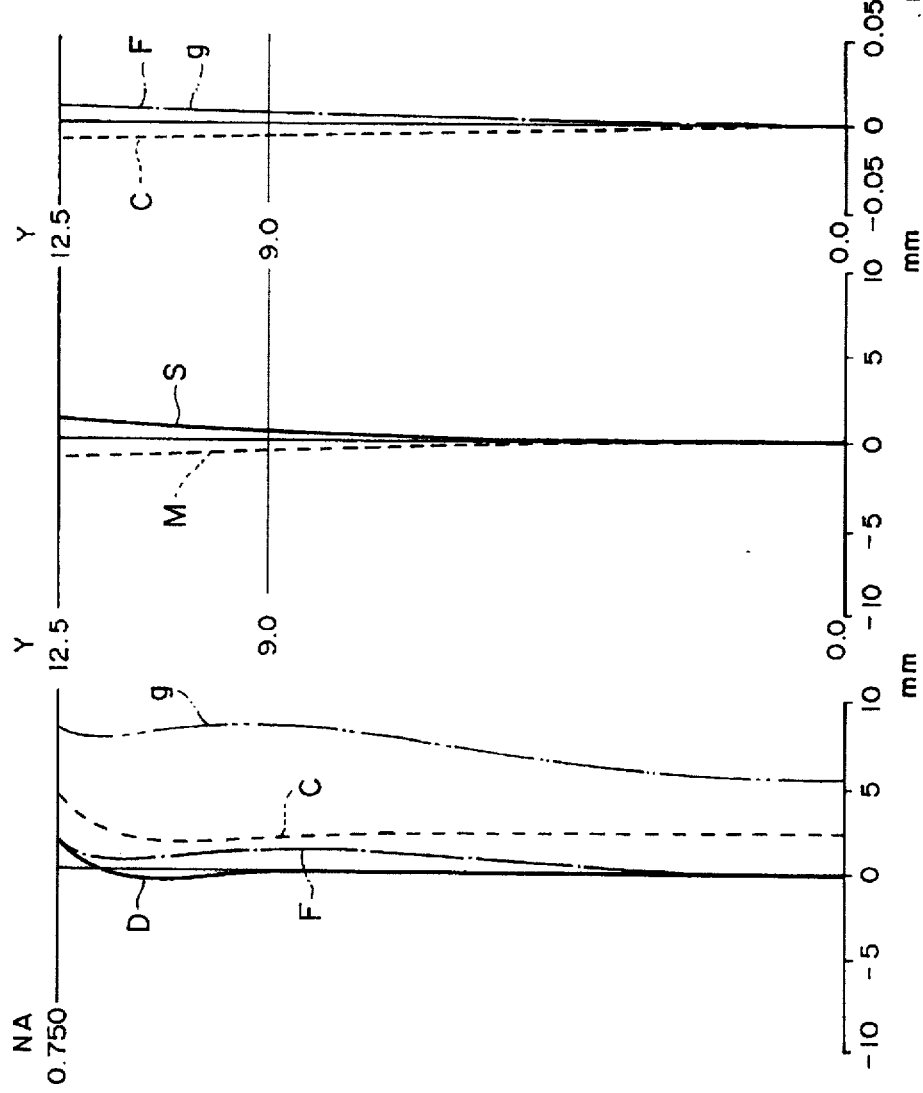
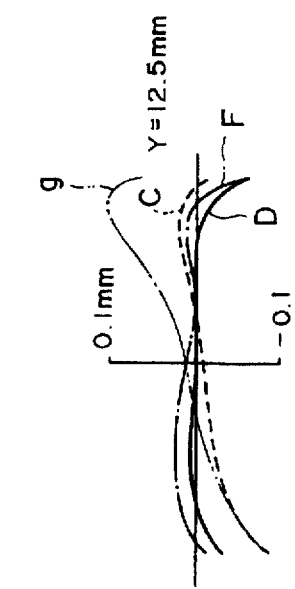
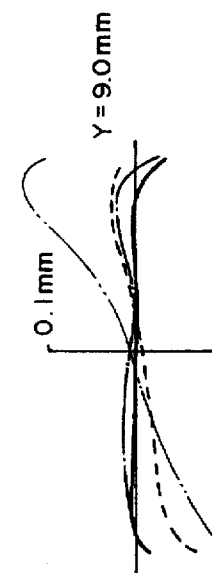

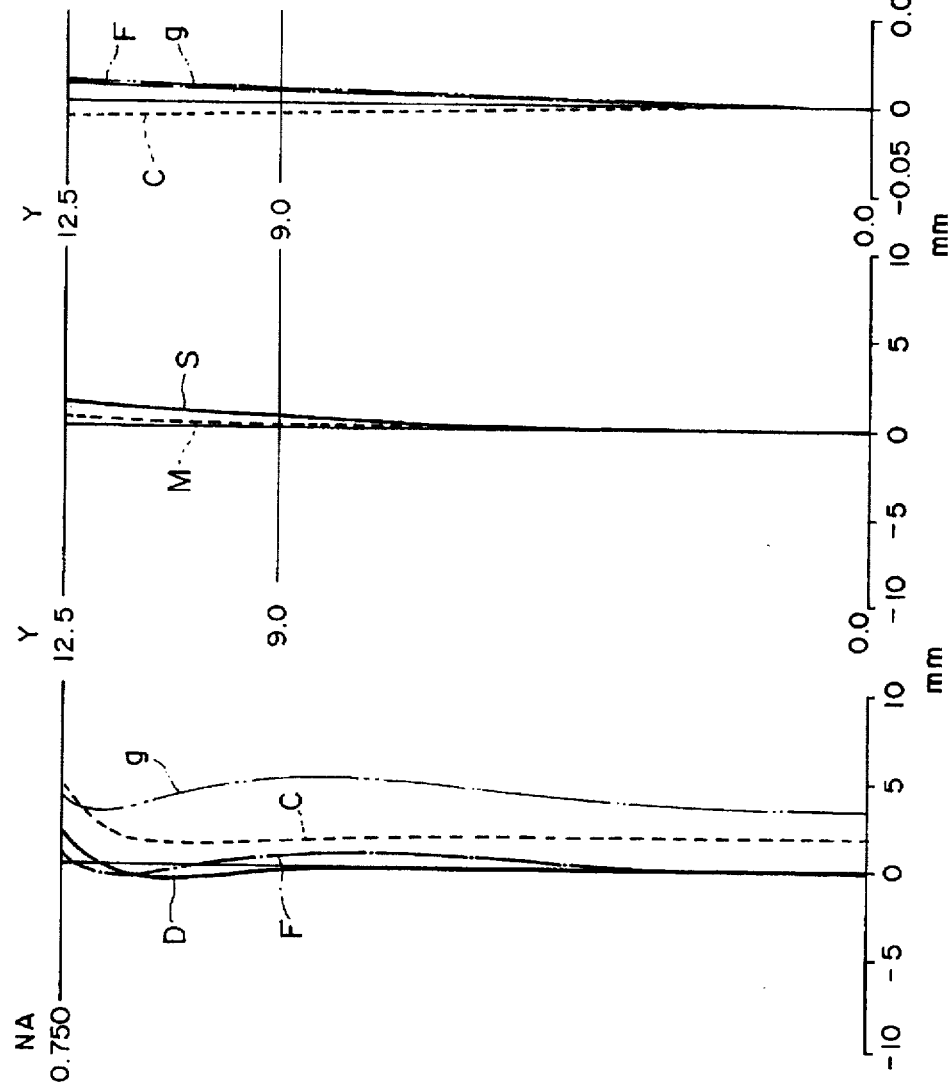
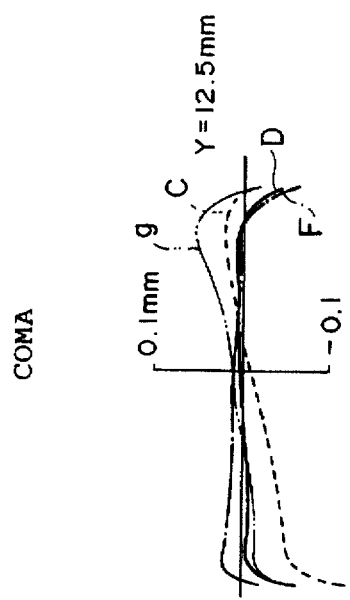
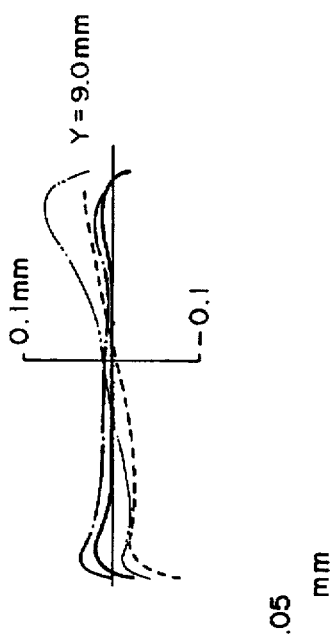

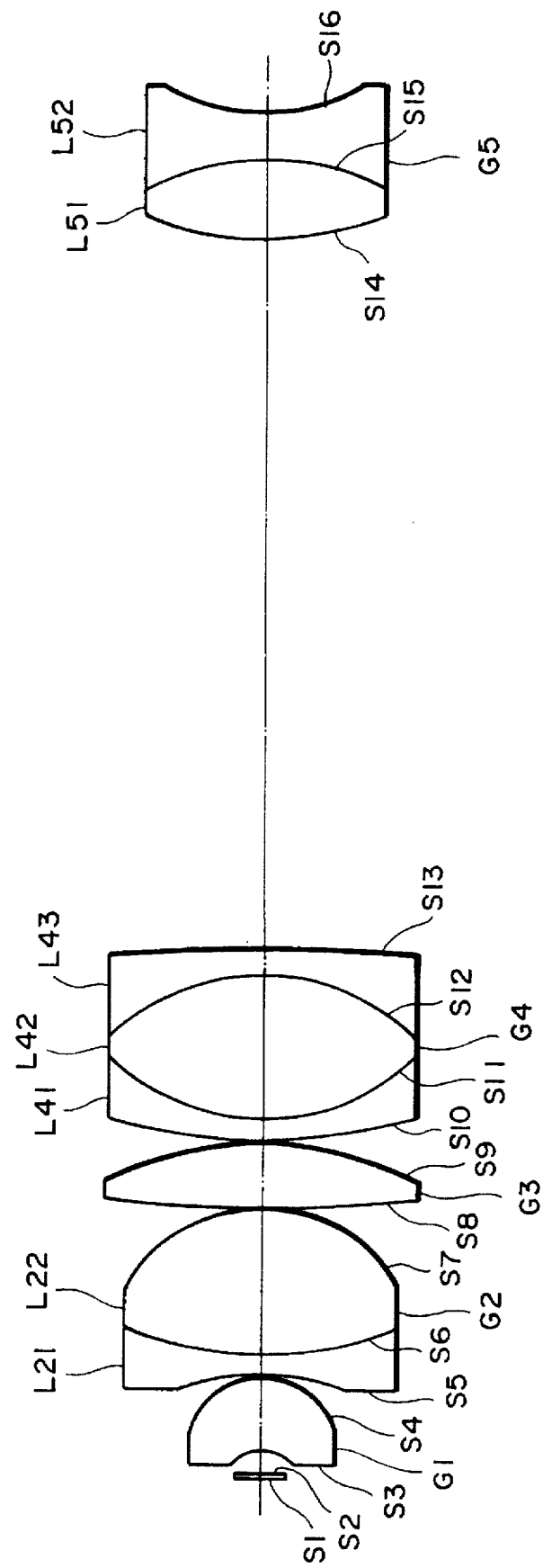

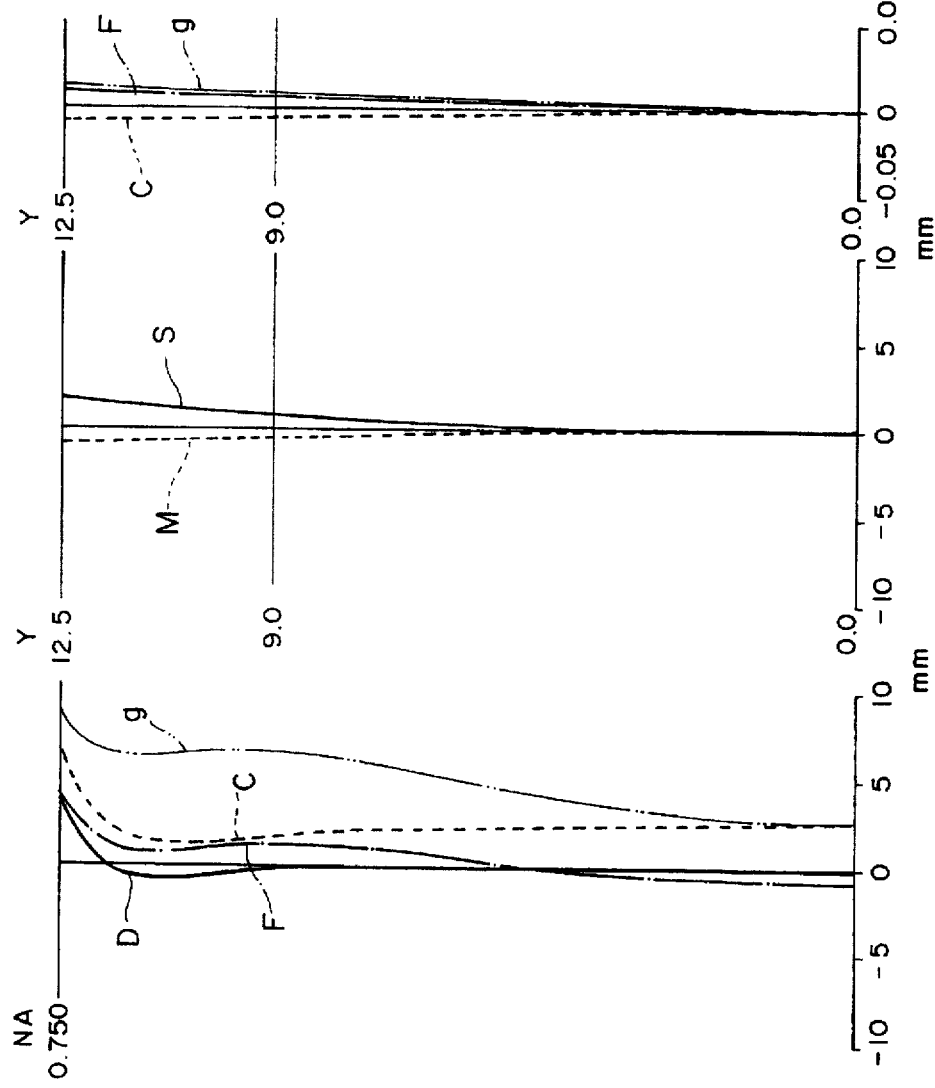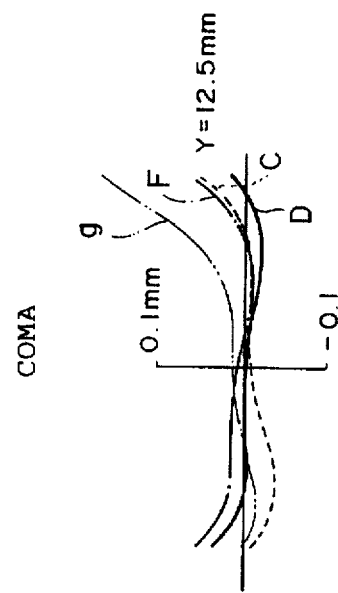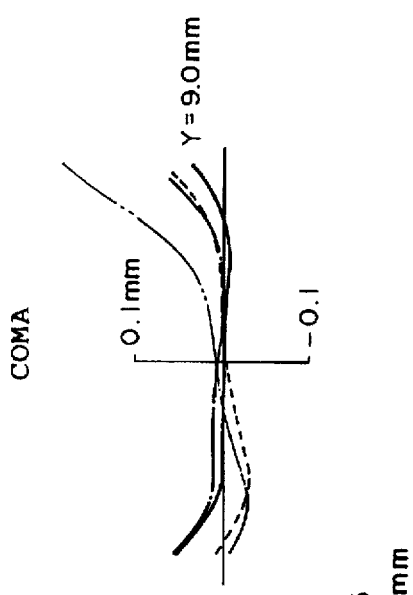

MICROSCOPE OBJECTIVE LENS AND MICROSCOPE

BACKGROUND OF THE INVENTION

1. Field of the Invention

The present invention relates to a microscope objective lens and a microscope and, in particular, to a semi-apochromatic microscope objective lens and a microscope which can also be used for observing fluorescence under downward radiation.

2. Related Background Art

In microscope objective lenses of recent years, there have been many lens systems which attain a high power, a large numerical aperture, and a favorably corrected secondary spectrum.

Also, in biological sample observation of recent years, on the increase has been the use of fluorescence observation microscopes in which a sample is irradiated with light having a short wavelength, i.e., ultraviolet excitation light, and then fluorescence emitted by the sample is observed. As the ultraviolet excitation light, wavelength light such as that at 365 nm, which is i-line, or 340 nm has mainly been used. Here, the transmittance of a microscope objective lens at a short wavelength region has been such that it must be, for example, 20% or more with respect to ultraviolet excitation light having a wavelength of about 340 nm.

As mentioned above, it is necessary for microscope objective lenses used for observing fluorescence to secure a predetermined transmittance with respect to ultraviolet excitation light. In a short wavelength region such as that of ultraviolet excitation light, however, not only the kinds of optical materials having favorable transmittance are limited but also the number of constituent lens sheets cannot be increased in order to secure a predetermined transmittance. Accordingly, it has been difficult for the microscope objective lenses used for observing fluorescence to correct aberration.

Also, when irradiated with light in a short wavelength region, the optical material constituting the objective lens itself may generate fluorescence. Since the fluorescence generated by a sample in microscopes for observing fluorescence is often very weak, the contrast of the sample image lowers when the optical material yields fluorescence. Further, depending on the kinds of optical materials, coloring may occur upon irradiation with strong ultraviolet rays, thereby generating solarization by which transmittance changes. Such optical materials that generate fluorescence or solarization are not suitable for microscope objective lenses for observing fluorescence.

Due to these restricting conditions, for example, a glass having an Abbe number of 30 or less, a glass having an Abbe number of 49 or less and a refractive index of 1.7 or more, and the like cannot be used for microscope objective lenses for observing fluorescence. Also, in addition to these glasses, the kinds of usable optical materials have been further limited due to the generation of fluorescence and solarization.

SUMMARY OF THE INVENTION

In view of the foregoing problems, the object of the present invention is to provide a semi-apochromatic microscope objective lens and a microscope which have a magnification of about 40, have favorably corrected various kinds of aberration, and can also be used for observing fluorescence under downward radiation.

In order to overcome the above-mentioned problems, the microscope objective lens of the present invention comprises; successively from the object side, a positive meniscus lens component G1 having a concave surface directed onto the object side; a positive meniscus cemented lens component G2 having a concave surface directed onto the object side; a biconvex lens component G3; a cemented lens component G4 having, at least, a negative lens and a biconvex lens; and a negative meniscus cemented lens component G5 having a concave surface directed onto the image side, wherein, assuming that the radius of curvature of the surface on the object side of the positive meniscus lens component G1 is r1, the radius of curvature of the surface closest to the object side of the positive meniscus cemented lens component G2 is r3, the composite focal length of the positive meniscus lens component G1 to the cemented lens component G4 is f1, the focal length of the negative meniscus cemented lens component G5 is f2, the focal length of the whole lens system is f, and the axial air space between the cemented lens component G4 and the negative meniscus cemented lens component G5 is D, the following conditions:

$$0.1 < r1/r3 < 0.3$$

$$-30 < f2/f1 < -10$$

$$5D/f < 8.5$$

are satisfied.

In a preferable embodiment of the present invention, the positive meniscus cemented lens component G2 comprises, successively from the object side, a negative lens L21 having a concave surface directed onto the object side and a positive lens L22 having a convex surface directed onto the image side, which are bonded together;

the cemented lens component G4 comprises, successively from the object side, a negative lens L41, a biconvex lens L42, and a negative lens L43 which are bonded together;

the negative meniscus cemented lens component G5 comprises, successively from the object side, a biconvex lens L51 and a biconcave lens L52 which are bonded together; and assuming that the Abbe number of the negative lens L21 in the positive meniscus cemented lens component G2 is v2, the Abbe number of the positive lens L22 in the positive meniscus cemented lens component G2 is v3, the Abbe number of the biconvex lens G3 is v4, the Abbe number of the negative lens L41 in the cemented lens component G4 is v5, the Abbe number of the biconvex lens L42 in the cemented lens component G4 is v6, the Abbe number of the negative lens L43 in the cemented lens component G4 is v7, and the Abbe number of the biconvex lens L51 in the negative cemented lens component G5 is v8, the following conditions:

$$45 < v2 < 70$$

$$80 < v3$$

$$75 < v4 + (v6 - v5 - v7) < 130$$

$$v8 < 65$$

are satisfied.

Also, the present invention provides a microscope comprising:

a light source for generating light with which a sample is irradiated;

an objective lens for subjecting the light from the sample to parallel; and an imaging lens for forming, on an image surface, an image of the parallel light from the objective lens;

wherein the objective lens comprises, successively from the object side, a positive meniscus lens component G1 having a concave surface directed onto the object side, a positive meniscus cemented lens component G2 having a concave surface directed onto the object side, a biconvex lens component G3, a cemented lens component G4 having, at least, a negative lens and a biconvex lens, and a negative meniscus cemented lens component G5 having a concave surface directed onto the image side and wherein, assuming that the radius of curvature of the surface on the object side of the positive meniscus lens component G1 is r1, the radius of curvature of the surface closest to the object side of the positive meniscus cemented lens component G2 is r3, the composite focal length of the positive meniscus lens component G1 to the cemented lens component G4 is f1, the focal length of the negative meniscus cemented lens component G5 is f2, the focal length of the whole lens system is f, and the axial air space between the cemented lens component G4 and the negative meniscus cemented lens component G5 is D, the following conditions:

$$0.1 < r1/r3 < 0.3$$

$$-30 < f2/f1 < -10$$

$$5 < D/f < 8.5$$

are satisfied.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A to 2E are aberration charts of the microscope objective lens in Embodiment 1;

FIGS. 6A to 6E are aberration charts of the microscope objective lens in Embodiment 3;

FIG. 7 is a view showing a configuration of a microscope objective lens in accordance with Embodiment 4 of the present invention;

FIGS. 8A to 8E are aberration charts of the microscope objective lens in Embodiment 4;

DESCRIPTION OF THE PREFERRED EMBODIMENTS

Figure 1:
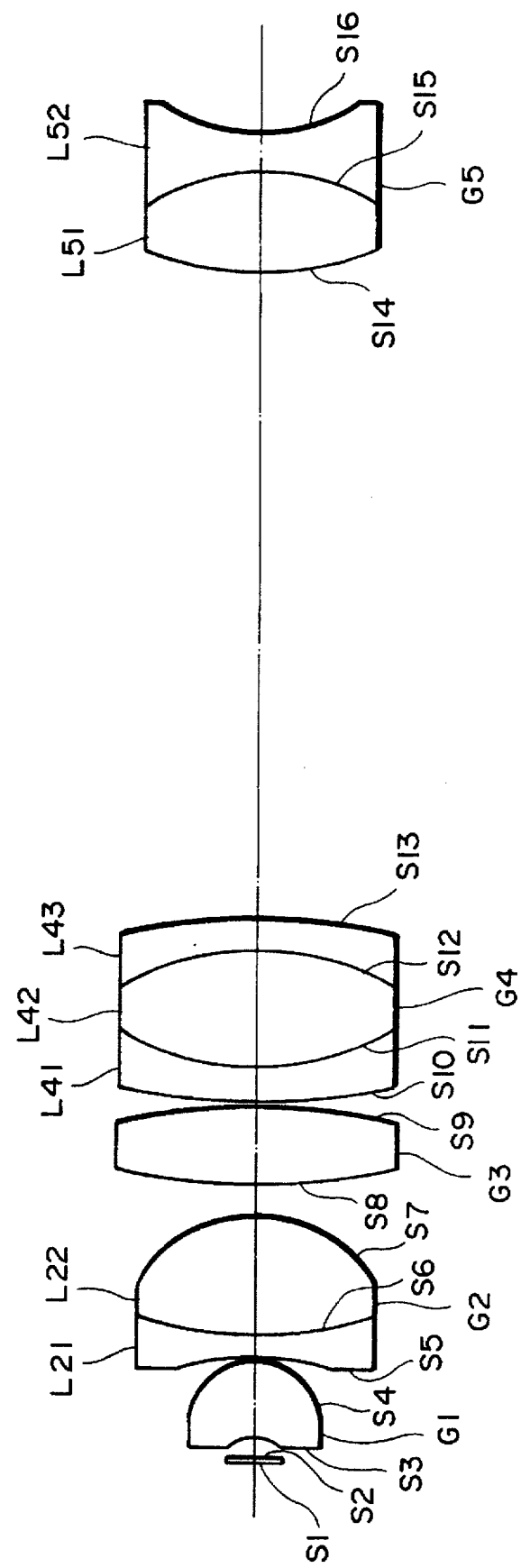
FIG. 1 is a view showing a configuration of a microscope objective lens in accordance with Embodiment 1 of the present invention.

The microscope objective lens of the present invention has a basic configuration comprising front and rear groups. Namely, the front group comprises, successively from the object side, a positive meniscus lens component G1 having a concave surface directed onto the object side, a positive meniscus cemented lens component G2 having a concave surface directed onto the object side, a biconvex lens component G3, and a cemented lens component G4 having, at least, a negative lens and a biconvex lens. Also, the rear group comprises a negative meniscus cemented lens component G5 having a concave surface directed onto the image side.

First, in order to minimize spherical aberration which is generated with respect to a luminous flux diffusing from the object surface, the positive meniscus lens component G1 has a positive meniscus form having a concave surface directed onto the object side.

Here, in the case of a lens system having a large numerical aperture, it is preferable that the diffusion of the diffused light which has passed through the positive meniscus lens component G1 be reduced, even to a limited extent, by the positive refractive power of the positive meniscus cemented lens component G2.

As previously mentioned, however, due to the restriction on optical materials which are usable for microscopes used for observing fluorescence, a glass having a small Abbe number cannot be used for the cemented lens component G4 for correcting chromatic aberration. Accordingly, in order to prevent chromatic aberration of the whole lens system from being insufficiently corrected, it is preferable that a lens having a negative refractive power be used in the positive meniscus cemented lens component G2 so as to correct chromatic aberration.

Therefore, in order to minimize spherical aberration which is generated with respect to the diffusing luminous flux, the positive meniscus cemented lens component G2 has a positive meniscus form with a concave surface directed onto the object side. Preferably, in order to suppress generation of high-order aberration in color, the positive meniscus cemented lens component G2 comprises, successively from the object side, a negative lens L21 having a concave surface directed onto the object side and a positive lens L22 having a convex surface directed onto the image side, which are bonded together.

Also, the biconvex lens component G3 reduces the diffusion of the diffused light from the positive meniscus cemented lens component G2 or converts this diffused light into converged light, whereby the light emitted therefrom is introduced into the cemented lens component G4.

Further, the cemented lens component G4 includes, at least, a negative lens and a biconvex lens and corrects chromatic aberration, spherical aberration, and the like.

Also, the negative meniscus cemented lens component G5 has a negative meniscus form with a concave surface directed onto the image side and corrects curvature, coma, chromatic aberration in magnification, and the like.

The present invention satisfies the following conditional expressions (1) to (3):

$$0.1 < r1/r3 < 0.3 \tag{1}$$

$$-30 < f2/f1 < -10 \tag{2}$$

$$5 < D/f < 8.5 \tag{3}$$

wherein r1: radius of curvature of the surface on the object side of the positive meniscus lens component G1;

r3: radius of curvature of the surface closest to the object side of the positive meniscus cemented lens component G2;

f1: composite focal length of the positive meniscus lens component G1 to the cemented lens component G4, namely, focal length of the front group;

f2: focal length of the negative meniscus cemented lens component G5, namely, focal length of the rear group;

f: focal length of the whole lens system; and

D: axial air space between the cemented lens component G4 and the negative meniscus cemented lens component G5.

Conditional expression (1) defines an appropriate range for the ratio of the radius of curvature of the surface on the object side of the positive meniscus lens component G1 to the radius of curvature of the surface closest to the object side of the positive meniscus cemented lens component G2. This conditional expression is necessary for correcting Petzval sum so as to eliminate image surface curvature, thereby correcting spherical aberration and coma of the whole lens system.

Below the lower limit of conditional expression (1), both image surface curvature and spherical aberration are corrected too much, thereby making it impossible to attain favorable imaging performances.

Beyond the upper limit of conditional expression (1), by contrast, both image surface curvature and spherical aberration are corrected insufficiently, thereby making it impossible to attain favorable imaging performances.

Here, in order to attain further favorable imaging performances, the upper limit and lower limit of conditional expression (1) are preferably set to 0.27 and 0.12, respectively.

Conditional expression (2) defines an appropriate range for the ratio of the focal length f1 of the front group to the focal length f2 of the rear group. This conditional expression defines a condition for power configuration suitable for correcting image surface curvature, coma, and chromatic aberration in magnification.

Beyond the upper limit of conditional expression (2), the power (refractive power) of the rear group becomes so strong that image surface curvature is corrected too much. When this image surface curvature is to be corrected by the front group, symmetry of coma deteriorates, thereby making it impossible to attain favorable imaging performances.

Below the lower limit of conditional expression (2), by contrast, the power of the front group becomes so strong that chromatic aberration in magnification is generated too much in the front group. As a result, the chromatic aberration in magnification generated in the front group cannot be corrected by the rear group any more, thereby making it impossible to attain favorable imaging performances.

Here, in order to obtain further favorable imaging performances, the upper limit and lower limit of conditional expression (2) are preferably set to −11 and −23, respectively.

Conditional expression (3) defines an appropriate range for the axial air space between the front group and rear group. This conditional expression defines a condition for controlling the balance between the meridional surface and the sagittal surface and the balance of chromatic aberration in magnification by means of the axial air space between the front and rear groups.

Below the lower limit of conditional expression (3), the axial air space becomes so short that chromatic aberration in magnification is corrected insufficiently and the meridional image surface is on the under (negative) side.

Beyond the upper limit of conditional expression (3), by contrast, the axial air space becomes so long that the meridional image surface is on the over (positive) side. Also, the whole lens length is elongated so much that it cannot be accommodated within a lens barrel any more.

Here, in order to obtain further favorable imaging performances, the upper limit and lower limit of conditional expression (3) are preferably set to 7 and 5.8, respectively.

Preferably, as mentioned above, in order to suppress generation of high-order aberration in color, the positive meniscus cemented lens component G2 comprises, successively from the object side, the negative lens L21 having a concave surface directed onto the object side and the positive lens L22 having a convex surface directed onto the image side, which are bonded together.

Also, preferably, in order to favorably correct chromatic aberration, spherical aberration, and the like, the cemented lens component G4 comprises, successively from the object side, a negative lens L41, a biconvex lens L42, and a negative lens L43 which are bonded together.

Further, preferably, in order to favorably correct image surface curvature, coma, chromatic aberration, and the like, the negative meniscus cemented lens component G5 comprises, successively from the object side, a biconvex lens L51 and a biconcave lens L52 which are bonded together.

Preferably, in addition to the configurations of the positive meniscus cemented lens component G2, cemented lens component G4, and negative meniscus cemented lens component G5 mentioned above, the present invention satisfies the following conditional expressions (4) to (7):

$$45 < v2 < 70 \tag{4}$$

$$80 < v3 \tag{5}$$

$$75 < v4 + (v6 - v - v7) < 130 \tag{6}$$

$$v8 < 65 \tag{7}$$

wherein v2: Abbe number of the negative lens L21 in the positive meniscus cemented lens component G2;

v3: Abbe number of the positive lens L22 in the positive meniscus cemented lens component G2;

v4: Abbe number of the biconvex lens G3;

v5: Abbe number of the negative lens L41 in the cemented lens component G4;

v6: Abbe number of the biconvex lens L42 in the cemented lens component G4;

v7: Abbe number of the negative lens L43 in the cemented lens component G4; and v8: Abbe number of the biconvex lens L51 in the negative cemented lens component G5.

Conditional expressions (4) and (5) respectively define appropriate ranges for Abbe numbers of optical materials used in the negative lens L21 and positive lens L22 in the positive meniscus cemented lens component G2. These conditional expressions define conditions for favorably correcting chromatic aberration such as axial chromatic aberration in particular.

As mentioned above, in order to secure a predetermined transmittance in a microscope for observing fluorescence, a glass having an Abbe number of 30 or less and a glass having an Abbe number of 49 or less and a refractive index of 1.7 or more cannot be used. Accordingly, since axial chromatic aberration cannot be corrected sufficiently by the cemented lens component G4 alone, it is necessary to minimize the Abbe number of the negative lens L21 and maximize the Abbe number of the positive lens L22.

Beyond the upper limit of conditional expression (4), it is not preferable in that axial chromatic aberration is insufficiently corrected.

Below the lower limit of conditional expression (4), by contrast, it is not preferable in that, though axial chromatic aberration can be favorably corrected, spherical aberration at a shorter wavelength is corrected too much with respect to that at a reference line.

Preferably, in order to obtain further favorable imaging performances, the upper limit and lower limit of conditional expression (4) are preferably set to 62 and 52, respectively.

Below the lower limit of conditional expression (5), it is not preferable in that the secondary spectrum deteriorates, thereby lowering contrast.

Here, in order to further improve contrast, the lower limit of conditional expression (5) is preferably set to 90.

Conditional expression (6) defines an Abbe number difference between the biconvex lens component G3 and cemented lens component G4 for correcting chromatic aberration. According to this conditional expression, axial chromatic aberration and chromatic aberration in magnification can attain a favorable balance therebetween.

Beyond the upper limit of conditional expression (6), it is not preferable in that a limit usable for microscopes used for observing fluorescence is lost, whereby a desired transmittance cannot be secured.

Below the lower limit of conditional expression (6), in a state where axial chromatic aberration is favorably corrected, correction of chromatic aberration in magnification tends to be on the under (negative) side to a large extent.

Here, in order to obtain further favorable imaging performances, the upper limit and lower limit of conditional expression (6) are preferably set to 110 and 90, respectively.

Conditional expression (7) defines the Abbe number of the biconvex lens L51 in the negative meniscus cemented lens component G5, which is mainly used for correcting chromatic aberration in magnification in the rear group.

Beyond the upper limit of conditional expression (7), chromatic aberration in magnification is corrected insufficiently, thereby making it impossible to attain favorable imaging performances.

Here, in order to obtain further favorable imaging performances, the upper limit of conditional expression (7) is preferably set to 58.

In the following, embodiments of the present invention will be explained with reference to attached drawings.

In each embodiment, the microscope objective lens of the present invention comprises, successively from the object side, a positive meniscus lens component G1 having a concave surface directed onto the object side, a positive meniscus cemented lens component G2 having a concave surface directed onto the object side, a biconvex lens component G3, a cemented lens component G4 having, at least, a negative lens and a biconvex lens, and a negative meniscus cemented lens component G5 having a concave surface directed onto the image side.

Here, in each embodiment, an imaging lens (second objective lens) is disposed on the image side of the microscope objective lens with an axial air space of 140 mm therebetween. As the microscope objective lens and the imaging lens are used in combination, an infinite distance type optical system is formed.

In the aberration charts shown in the following embodiments are those in cases where the axial air space between the microscope objective lens and the imaging lens is 140 mm. Nevertheless, the inventors have verified that various aberration values hardly change when the axial air space is within the range of 50 to 250 mm.

Figure 9:
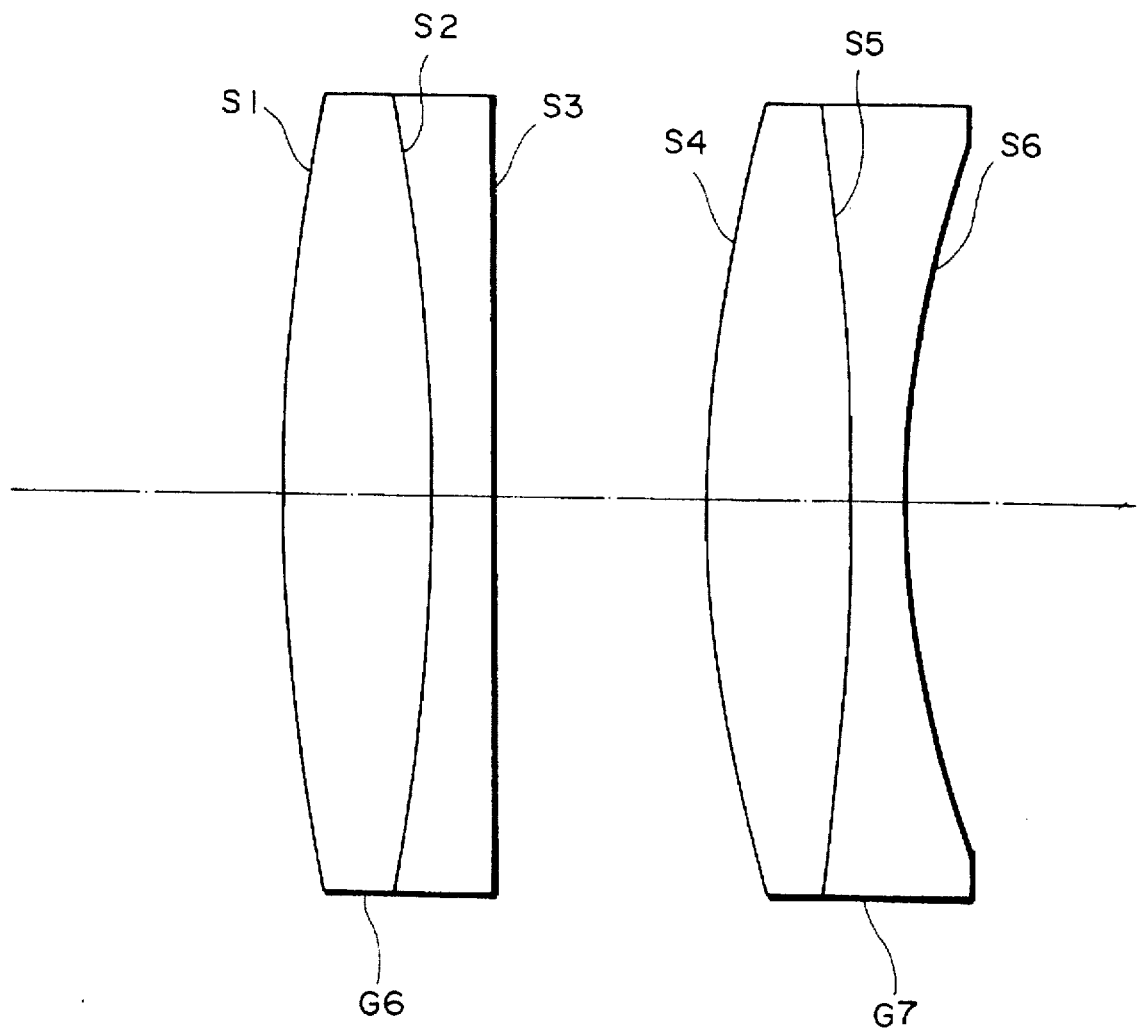
FIG. 9 is a view showing a configuration of an imaging lens in each embodiment.

FIG. 9 is a view showing a configuration of an imaging lens (second objective lens) applied to each embodiment.

The depicted imaging lens comprises, successively from the object side, a cemented positive lens G6 composed of a biconvex lens and a biconcave lens and a cemented positive lens G7 composed of a biconvex lens and a biconcave lens.

The following Table 1 shows values of various items of the imaging lens in each embodiment. In Table 1, S1 to S6 at the left end indicate lens surfaces in the order counted from the object side, r indicates the radius of curvature of each lens surface, d indicates each lens surface spacing, and n and v respectively indicate the refractive index and Abbe number with respect to d-line ($\lambda$=587.6 nm).

TABLE 1

|    | r        | d      | n       | v     |
|----|----------|--------|---------|-------|
| S1 | 15.0100  | 1.0201 | 1.62280 | 57.03 |
| S2 | −15.0100 | 0.4000 | 1.74950 | 35.19 |
| S3 | 320.1458 | 1.5001 |         |       |
| S4 | 10.0521  | 1.0201 | 1.66755 | 41.96 |
| S5 | −16.9097 | 0.3600 | 1.61265 | 44.40 |
| S6 | 7.3828   |        |         |       |

Embodiment 1

FIG. 1 shows a configuration of a microscope objective lens in accordance with Embodiment 1 of the present invention.

The depicted microscope objective lens comprises, successively from the object side, a positive meniscus lens component G1 having a concave surface directed onto the object side; a cemented positive lens component G2 composed of a biconcave lens L21 and a biconvex lens L22; a biconvex lens component G3; a cemented positive lens component G4 composed of a negative meniscus lens L41 having a convex surface directed onto the object side, a biconvex lens L42, and a negative meniscus lens L43 having a concave surface directed onto the object side; and a cemented negative lens component G5 composed of a biconvex lens L51 and a biconcave lens L52.

The following Table 2 shows values of various items in Embodiment 1 of the present invention. In Table 2, f, NA, and β respectively indicate the focal length, numerical aperture, and magnification of the whole lens system.

Further, S1 to S16 at the left end indicate lens surfaces in the order counted from the object side, r indicates the radius of curvature of each lens surface, d indicates each lens surface spacing, and n and v respectively indicate the refractive index and Abbe number with respect to d-line ($\lambda$=587.6 nm).

TABLE 2

β = 40×
NA = 0.75
f = 1 mm

|  | r | d | n | ν |  |
|---|---|---|---|---|---|
| S1 | ∞ | 0.17 | 1.52216 | 58.80 | (cover glass) |
| S2 | ∞ | 0.2180 |  |  |  |
| S3 | −0.4501 | 0.6664 | 1.77072 | 50.21 |  |
| S4 | −0.6720 | 0.0360 |  |  |  |
| S5 | −3.0257 | 0.2000 | 1.51823 | 58.90 |  |
| S6 | 3.3217 | 1.0953 | 1.43425 | 95.02 |  |
| S7 | −1.3435 | 0.3150 |  |  |  |
| S8 | 5.9502 | 0.7226 | 1.49782 | 82.51 |  |
| S9 | −5.8612 | 0.0460 |  |  |  |
| S10 | 7.8889 | 0.3000 | 1.68893 | 31.07 |  |
| S11 | 2.2480 | 1.1201 | 1.43425 | 95.02 |  |
| S12 | −2.5108 | 0.3000 | 1.60342 | 38.02 |  |
| S13 | −5.4989 | 6.0004 |  |  |  |
| S14 | 3.2047 | 0.9513 | 1.53172 | 48.96 |  |
| S15 | −2.1879 | 0.3600 | 1.48749 | 70.40 |  |
| S16 | 1.7674 |  |  |  |  |

(Values Corresponding to Conditions)
(1) r1/r3 = 0.149
(2) f2/f1 = 13.16
(3) D/f = 6
(4) ν2 = −58.90
(5) ν3 = 95.02
(6) ν4 + (ν6 − ν5 − ν7) = 108.4
(7) ν8 = 48.96

FIGS. 2A to 2E show aberration charts for various kinds of aberration of the microscope objective lens in Embodiment 1.

In each aberration chart, Y, NA, D, C, F, and g indicate image height, numerical aperture, d-line (λ=587.6 nm), C-line (λ=656.3 nm), F-line (X=486.1 nm), and g-line (λ=435.6 nm), respectively.

In the aberration chart showing astigmatism, continuous curve S indicates the sagittal image surface, whereas broken curve M indicates the meridional image surface.

As can be seen from each aberration chart, in this embodiment, various kinds of aberration are favorably corrected while a transmittance of 40% or more is secured with respect to ultraviolet excitation light for observing fluorescence under downward radiation.

Embodiment 2

Figure 3:
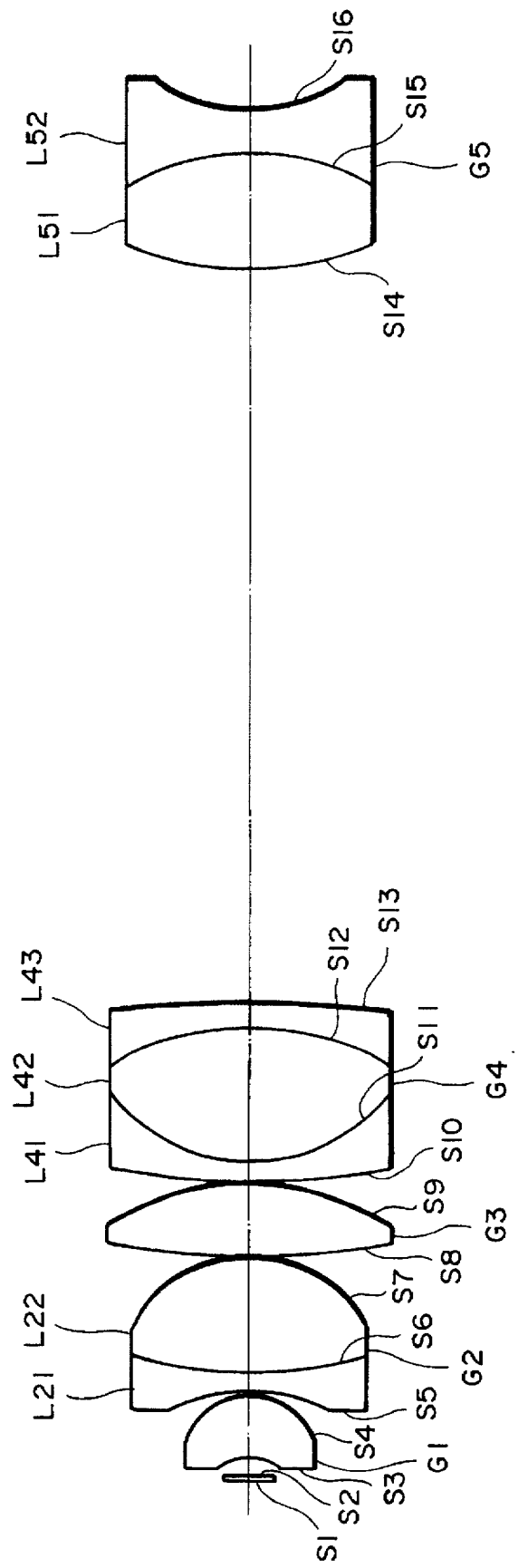
FIG. 3 is a view showing a configuration of a microscope objective lens in accordance with Embodiment 2 of the present invention.
Figure 4:
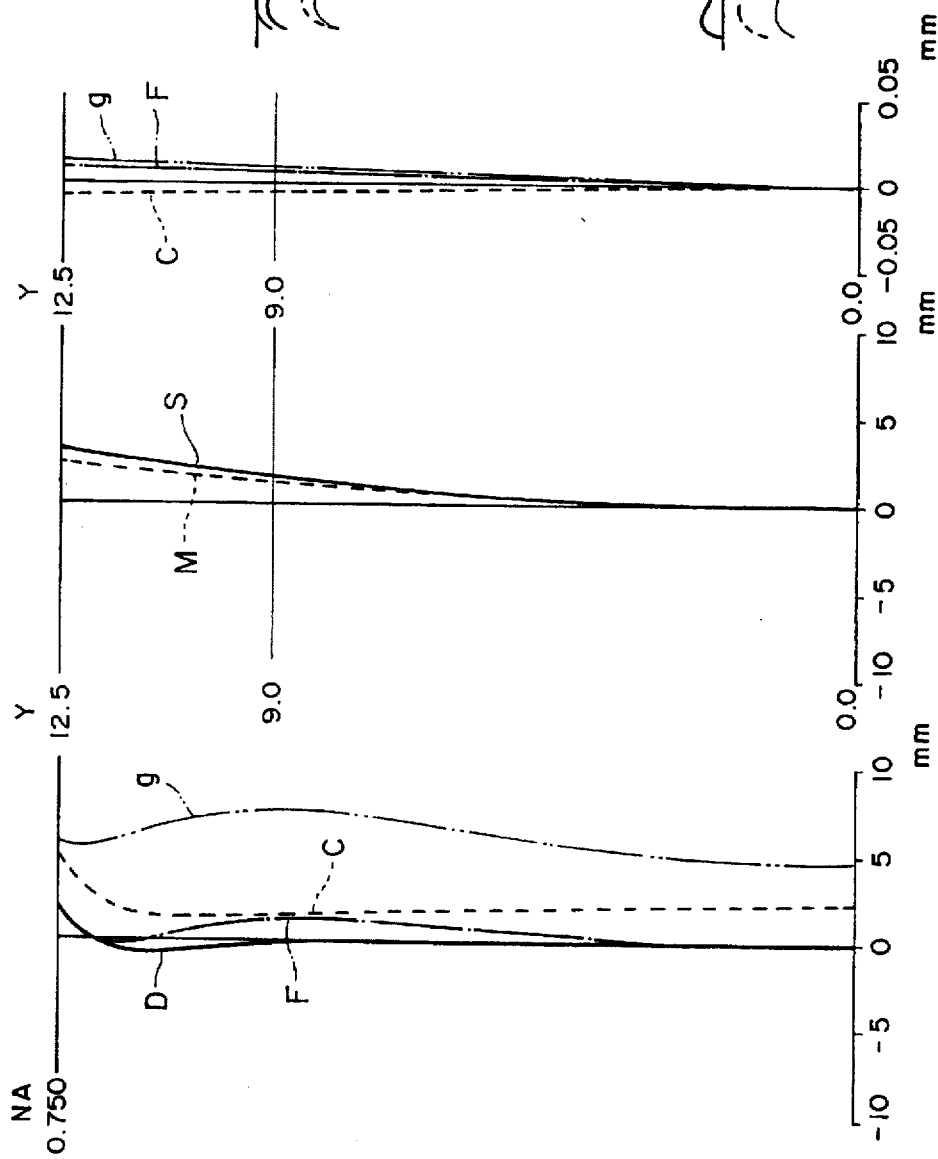
FIGS. 4A to 4E are aberration charts of the microscope objective lens in Embodiment 2.

FIG. 3 shows a configuration of a microscope objective lens in accordance with Embodiment 2 of the present invention.

The depicted microscope objective lens comprises, successively from the object side, a positive meniscus lens component G1 having a concave surface directed onto the object side; a cemented positive lens component G2 composed of a biconcave lens L21 and a biconvex lens L22; a biconvex lens component G3; a cemented positive lens component G4 composed of a negative meniscus lens L41 having a convex surface directed onto the object side, a biconvex lens L42, and a negative meniscus lens L43 having a concave surface directed onto the object side; and a cemented negative lens component G5 composed of a biconvex lens L51 and a biconcave lens L52.

The following Table 3 shows values of various items in Embodiment 2 of the present invention. In Table 3, f, NA, and D respectively indicate the focal length, numerical aperture, and magnification of the whole lens system.

Further, S1 to S16 at the left end indicate lens surfaces in the order counted from the object side, r indicates the radius of curvature of each lens surface, d indicates each lens surface spacing, and n and ν respectively indicate the refractive index and Abbe number with respect to d-line (λ=587.6 nm).

TABLE 3

β = 40×
NA = 0.75
f = 1 mm

|  | r | d | n | ν |  |
|---|---|---|---|---|---|
| S1 | ∞ | 0.17 | 1.52216 | 58.80 | (cover glass) |
| S2 | ∞ | 0.2180 |  |  |  |
| S3 | −0.4204 | 0.5618 | 1.77278 | 49.45 |  |
| S4 | −0.6336 | 0.0300 |  |  |  |
| S5 | −1.7404 | 0.1800 | 1.50137 | 56.41 |  |
| S6 | 3.6359 | 1.0324 | 1.43425 | 95.02 |  |
| S7 | −1.2674 | 0.0200 |  |  |  |
| S8 | 9.5013 | 0.6554 | 1.49782 | 82.51 |  |
| S9 | −2.4624 | 0.0200 |  |  |  |
| S10 | 7.3518 | 0.1800 | 1.57501 | 41.42 |  |
| S11 | 1.5994 | 1.2601 | 1.43425 | 95.02 |  |
| S12 | −2.4155 | 0.2200 | 1.58144 | 40.75 |  |
| S13 | −9.5621 | 6.8005 |  |  |  |
| S14 | 3.1994 | 1.0873 | 1.56882 | 56.04 |  |
| S15 | −2.3057 | 0.3800 | 1.48749 | 70.40 |  |
| S16 | 1.6614 |  |  |  |  |

(Values Corresponding to Conditions)
(1) r1/r3 = 0.242
(2) f2/f1 = 21.23
(3) D/f = 6.8
(4) ν2 = −56.41
(5) ν3 = 95.02
(6) ν4 + (ν6 − ν5 − ν7) = 95.4
(7) ν8 = 56.04

FIGS. 4A to 4E show aberration charts for various kinds of aberration of the microscope objective lens in Embodiment 2.

In each aberration chart, Y, NA, D, C, F, and g indicate image height, numerical aperture, d-line (λ=587.6 nm), C-line (λ=656.3 nm), F-line (λ=486.1 nm), and g-line (λ=435.6 nm), respectively.

In the aberration chart showing astigmatism, continuous curve S indicates the sagittal image surface, whereas broken curve M indicates the meridional image surface.

As can be seen from each aberration chart, in this embodiment, various kinds of aberration are favorably corrected while a transmittance of 40% or more is secured with respect to ultraviolet excitation light for observing fluorescence under downward radiation.

Embodiment 3

Figure 5:
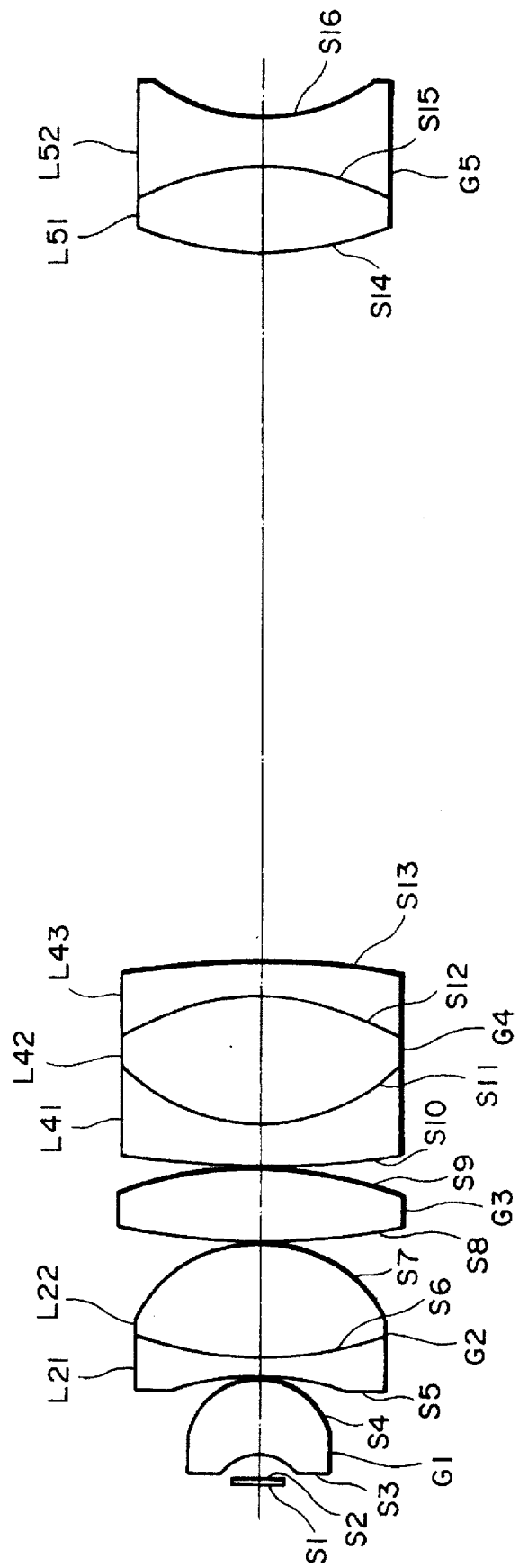
FIG. 5 is a view showing a configuration of a microscope objective lens in accordance with Embodiment 3 of the present invention.

FIG. 5 shows a configuration of a microscope objective lens in accordance with Embodiment 3 of the present invention.

The depicted microscope objective lens comprises, successively from the object side, a positive meniscus lens component G1 having a concave surface directed onto the object side; a cemented positive lens component G2 composed of a biconcave lens L21 and a biconvex lens L22; a biconvex lens component G3; a cemented positive lens component G4 composed of a negative meniscus lens L41 having a convex surface directed onto the object side, a biconvex lens L42, and a negative meniscus lens L43 having a concave surface directed onto the object side; and a cemented negative lens component G5 composed of a biconvex lens L51 and a biconcave lens L52.

The following Table 4 shows values of various items in Embodiment 3 of the present invention. In Table 4, f, NA, and β respectively indicate the focal length, numerical aperture, and magnification of the whole lens system.

Further, S1 to S16 at the left end indicate lens surfaces in the order counted from the object side, r indicates the radius of curvature of each lens surface, d indicates each lens surface spacing, and n and ν respectively indicate the refractive index and Abbe number with respect to d-line (λ=587.6 nm).

TABLE 4

β = 40×
NA = 0.75
f = 1 mm

| | r | d | n | ν | |
|---|---|---|---|---|---|
| S1 | ∞ | 0.17 | 1.52216 | 58.80 | (cover glass) |
| S2 | ∞ | 0.2383 | | | |
| S3 | −0.4693 | 0.6401 | 1.77072 | 50.21 | |
| S4 | −0.6827 | 0.0300 | | | |
| S5 | −2.5190 | 0.2000 | 1.50137 | 56.41 | |
| S6 | 3.5320 | 1.0138 | 1.43388 | 95.56 | |
| S7 | −1.3133 | 0.0200 | | | |
| S8 | 5.7762 | 0.6487 | 1.49782 | 82.51 | |
| S9 | −3.5237 | 0.0200 | | | |
| S10 | 9.0041 | 0.4000 | 1.60342 | 38.02 | |
| S11 | 1.6947 | 1.1600 | 1.43388 | 95.56 | |
| S12 | −2.2345 | 0.3000 | 1.57501 | 41.42 | |
| S13 | −8.0614 | 6.4004 | | | |
| S14 | 2.9839 | 0.7899 | 1.54739 | 53.47 | |
| S15 | −2.3173 | 0.4000 | 1.48749 | 70.40 | |
| S16 | 1.7243 | | | | |

(Values Corresponding to Conditions)
(1) r1/r3 = 0.186
(2) f2/f1 = 21.32
(3) D/f = 6.4
(4) ν2 = −56.41
(5) ν3 = 56.41
(6) ν4 + (ν6 − ν5 − ν7) = 98.6
(7) ν8 = 53.47

FIGS. 6A to 6E show aberration charts for various kinds of aberration of the microscope objective lens in Embodiment 3.

In each aberration chart, Y, NA, D, C, F, and g indicate image height, numerical aperture, d-line (λ=587.6 nm), C-line (λ=656.3 nm), F-line (λ=486.1 nm), and g-line (λ=435.6 nm), respectively.

In the aberration chart showing astigmatism, continuous curve S indicates the sagittal image surface, whereas broken curve M indicates the meridional image surface.

As can be seen from each aberration chart, in this embodiment, various kinds of aberration are favorably corrected while a transmittance of 40% or more is secured with respect to ultraviolet excitation light for observing fluorescence under downward radiation.

Embodiment 4

FIG. 7 shows a configuration of a microscope objective lens in accordance with Embodiment 4 of the present invention.

The depicted microscope objective lens comprises, successively from the object side, a positive meniscus lens component G1 having a concave surface directed onto the object side; a cemented positive lens component G2 composed of a biconcave lens L21 and a biconvex lens L22; a biconvex lens component G3; a cemented positive lens component G4 composed of a negative meniscus lens L41 having a convex surface directed onto the object side, a biconvex lens L42, and a negative meniscus lens L43 having a concave surface directed onto the object side; and a cemented negative lens component G5 composed of a biconvex lens L51 and a biconcave lens L52.

The following Table 5 shows values of various items in Embodiment 4 of the present invention. In Table 5, f, NA, and β respectively indicate the focal length, numerical aperture, and magnification of the whole lens system.

Further, S1 to S16 at the left end indicate lens surfaces in the order counted from the object side, r indicates the radius of curvature of each lens surface, d indicates each lens surface spacing, and n and ν respectively indicate the refractive index and Abbe number with respect to d-line (ν=587.6 nm).

TABLE 5

β = 40×
NA = 0.75
f = 1 mm

| | r | d | n | ν | |
|---|---|---|---|---|---|
| S1 | ∞ | 0.17 | 1.52216 | 58.80 | (cover glass) |
| S2 | ∞ | 0.2169 | | | |
| S3 | −0.4571 | 0.6696 | 1.71951 | 53.10 | |
| S4 | −0.6959 | 0.0199 | | | |
| S5 | −2.2504 | 0.1990 | 1.50137 | 56.41 | |
| S6 | 3.5671 | 1.2746 | 1.43388 | 95.56 | |
| S7 | −1.4344 | 0.0199 | | | |
| S8 | 11.9386 | 0.5970 | 1.49782 | 82.51 | |
| S9 | −2.9487 | 0.0199 | | | |
| S10 | 5.0226 | 0.1990 | 1.62004 | 36.27 | |
| S11 | 2.0140 | 1.2936 | 1.43388 | 95.56 | |
| S12 | −1.9792 | 0.2189 | 1.54813 | 45.86 | |
| S13 | 23.6566 | 6.4680 | | | |
| S14 | −3.6799 | 0.6965 | 1.55200 | 49.71 | |
| S15 | −2.5704 | 0.3980 | 1.48749 | 70.40 | |
| S16 | 1.8888 | | | | |

(Values Corresponding to Conditions)
(1) r1/r3 = 0.203
(2) f2/f1 = 12.39
(3) D/f = 6.5
(4) ν2 = −56.41
(5) ν3 = 95.56
(6) ν4 + (ν6 − ν5 − ν7) = 95.9
(7) ν8 = 49.71

FIGS. 8A to 8E show aberration charts for various kinds of aberration of the microscope objective lens in Embodiment 4.

In each aberration chart, Y, NA, D, C, F, and g indicate image height, numerical aperture, d-line (λ=587.6 nm), C-line (λ=656.3 nm), F-line (λ=486.1 nm), and g-line (λ=435.6 nm), respectively.

In the aberration chart showing astigmatism, continuous curve S indicates the sagittal image surface, whereas broken curve M indicates the meridional image surface.

As can be seen from each aberration chart, in this embodiment, various kinds of aberration are favorably corrected while a transmittance of 40% or more is secured with respect to ultraviolet excitation light for observing fluorescence under downward radiation.

As explained in the foregoing, the present invention can realize a semi-apochromatic microscope objective lens which has a magnification of about 40, has favorably corrected various kinds of aberration, and can also be used for observing fluorescence under downward radiation.

Embodiment 5

Figure 10:
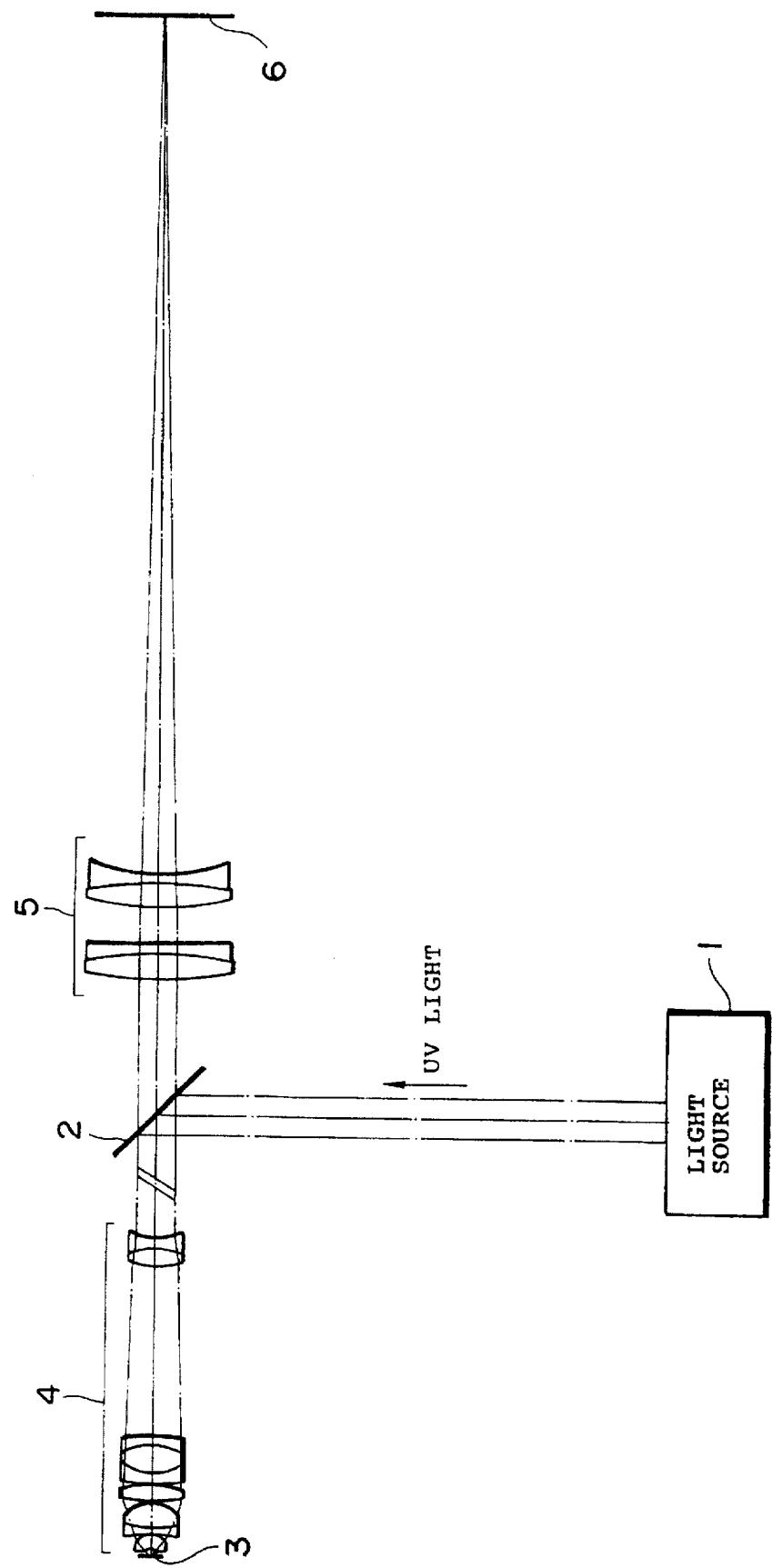
FIG. 10 is a schematic configurational view of a microscope in accordance with Embodiment 5 of the present invention.

FIG. 10 is a schematic configurational view showing a microscope in accordance with Embodiment 5 of the present invention. In this drawing, the microscope, e.g., microscope for observing fluorescence, has a light source 1, e.g., extra-high pressure mercury lamp, which generates light with a short wavelength, i.e., ultraviolet excitation light. Also, the microscope provides the above mentioned objective lens 4 for subjecting the light from a sample 3 to parallel and an imaging lens 5 for forming, on an image surface 6, an image of the parallel light from the objective lens 4.

The ultraviolet excitation light emitted from the light source 1 irradiates a sample 3 by way of a dichroic mirror. 2, for example. This dichroic mirror has a characteristic for reflecting the excitation light with a short wavelength while transmitting therethrough fluorescence with a long wavelength. Upon irradiation with the ultraviolet excitation light, the sample 3 emits light which has a wavelength longer than that of the excitation light. Thus emitted light, which is fluorescence, forms an image on an image surface 6 by way of a microscope objective lens 4 and an imaging lens (second objective lens) 5 which are mentioned above.

Since the microscope objective lens in accordance with the foregoing embodiments is used, a microscope having favorably corrected various kinds of aberration while securing a sufficient transmittance can be obtained.

Here, the present invention relates to an infinity correction type microscope, and U.S. Pat. Nos. 4,501,474 and 5,132,845 are incorporated herein by reference. The present invention is suitably applicable not only to microscopes for observing fluorescence but also to other microscopes using general kinds of light, thereby yielding effects similar to those mentioned above.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 207602 filed on Jul. 21, 1995 is hereby incorporated by reference.

What is claimed is:

1. A microscope objective lens comprising; successively from an object side, a positive meniscus lens component G1 having a concave surface directed onto the object side; a positive meniscus cemented lens component G2 having a concave surface directed onto the object side; a biconvex lens component G3; a cemented lens component G4 having, at least, a negative lens and a biconvex lens; and a negative meniscus cemented lens component G5 having a concave surface directed onto an image side, wherein, assuming that radius of curvature of the surface on the object side of said positive meniscus lens component G1 is r1, radius of curvature of the surface closest to the object side of said positive meniscus cemented lens component G2 is r3, composite focal length of said positive meniscus lens component G1 to said cemented lens component G4 is f1, focal length of said negative meniscus cemented lens component G5 is f2, focal length of said objective lens as a whole is f, and axial air space between said cemented lens component G4 and said negative meniscus cemented lens component G5 is D, the following conditions:

$0.1 < r1/r3 < 0.3$ $-30 < f2/f1 < -10$ $5 < D/f < 8.5$ are satisfied.

2. A microscope objective lens according to claim 1, wherein the following conditions:

$0.12 < r1/r3 < 0.27$ $-23 \leq f2/f1 < -11$ $5.8 < D/f < 7$ are satisfied.

3. A microscope objective lens according to claim 1, wherein said positive meniscus cemented lens component G2 comprises, successively from the object side, a negative lens L21 having a concave surface directed onto the object side and a positive lens L22 having a convex surface directed onto the image side, which are bonded together;

said cemented lens component G4 comprises, successively from the object side, a negative lens L41, a biconvex lens L42, and a negative lens L43 which are bonded together;

said negative meniscus cemented lens component G5 comprises, successively from the object side, a biconvex lens L51 and a biconcave lens L52 which are bonded together; and assuming that Abbe number of the negative lens L21 in said positive meniscus cemented lens component G2 is v2, Abbe number of the positive lens L22 in said positive meniscus cemented lens component G2 is v3, Abbe number of said biconvex lens G3 is v4, Abbe number of the negative lens L41 in said cemented lens component G4 is v5, Abbe number of the biconvex lens L42 in said cemented lens component G4 is v6, Abbe number of the negative lens L43 in said cemented lens component G4 is v7, and Abbe number of the biconvex lens L51 in said negative cemented lens component G5 is v8, the following conditions:

$45 < v2 < 70$ $80 < v3$ $75 < v4 + (v6 - v5 - v7) < 130$ $v8 < 65$ are satisfied.

4. A microscope objective lens according to claim 3, wherein the following conditions:

$52 < v2 < 62$ $90 < v3$ $90 < v4 + (v6 - v5 - v7) < 110$ $v8 < 58$ are satisfied.

5. A microscope comprising:

a light source for generating light with which a sample is irradiated;

an objective lens for subjecting the light from said sample to parallel; and an imaging lens for forming, on an image surface, an image of the parallel light from said objective lens;

wherein said objective lens comprises, successively from the object side, a positive meniscus lens component G1 having a concave surface directed onto an object side, a positive meniscus cemented lens component G2 having a concave surface directed onto the object side, a biconvex lens component G3, a cemented lens component G4 having, at least, a negative lens and a biconvex lens, and a negative meniscus cemented lens component G5 having a concave surface directed onto the image side, wherein, assuming that radius of curvature of the surface on the object side of said positive meniscus lens component G1 is r1, radius of curvature of the surface closest to the object side of said positive meniscus cemented lens component G2 is r3, composite focal length of said positive meniscus lens component G1 to said cemented lens component G4 is f1, focal length of said negative meniscus cemented lens component G5 is f2, the focal length of said objective lens as a whole is f, and axial air space between said cemented lens component G4 and said negative meniscus cemented lens component G5 is D, the following conditions:

$$0.1 < r1/r3 < 0.3$$

$$-30 < f2/f1 < -10$$

$$5 < D/f < 8.5$$

are satisfied.

6. A microscope according to claim 5, wherein the following conditions:

$$0.12 < r1/r3 < 0.27$$

$$-23 < f2/f1 < -11$$

$$5.8 < D/f < 7$$

are satisfied.

7. A microscope according to claim 5, wherein, in said objective lens, said positive meniscus cemented lens component G2 comprises, successively from the object side, a negative lens L21 having a concave surface directed onto the object side and a positive lens L22 having a convex surface directed onto the image side, which are bonded together;

said cemented lens component G4 comprises, successively from the object side, a negative lens L41, a biconvex lens L42, and a negative lens L43 which are bonded together;

said negative meniscus cemented lens component G5 comprises, successively from the object side, a biconvex lens L51 and a biconcave lens L52 which are bonded together; and assuming that Abbe number of the negative lens L21 in said positive meniscus cemented lens component G2 is ν2, Abbe number of the positive lens L22 in said positive meniscus cemented lens component G2 is Abbe number of said biconvex lens G3 is ν4, Abbe number of the negative lens L41 in said cemented lens component G4 is ν5, Abbe number of the biconvex lens L42 in said cemented lens component G4 is ν6, Abbe number of the negative lens L43 in said cemented lens component G4 is ν7, and Abbe number of the biconvex lens L51 in said negative cemented lens component G5 is ν8, the following conditions:

$$45 < \nu2 < 70$$

$$80 < \nu3$$

$$75 < \nu4 + (\Xi6 - \nu5 - \nu7) < 130$$

$$\nu8 < 65$$

are satisfied.

8. A microscope according to claim 7, wherein the following conditions:

$$52 < \nu2 < 62$$

$$90 < \nu3$$

$$90 < \nu4 + (\nu6 - \nu5 - \nu7) < 110$$

$$\nu8 < 58$$

are satisfied.

9. A microscope according to claim 5, wherein said microscope is an infinity correction type microscope.

* * * * *